United States Patent [19]

Antonello

[11] Patent Number: 4,601,386

[45] Date of Patent: Jul. 22, 1986

[54] DEVICE FOR MOVING OBJECTS

[76] Inventor: Flamino Antonello, Vaduz, Liechtenstein

[21] Appl. No.: 551,855

[22] Filed: Nov. 15, 1983

[51] Int. Cl.[4] ............................................... B65G 1/12
[52] U.S. Cl. ...................................... 198/576; 74/436;
 198/580; 360/92; 414/32; 414/94; 414/787;
 414/905
[58] Field of Search ...................... 414/32, 37, 94, 123,
 414/129, 266, 267, 233, 236, 237, 331, 787, 905;
 360/92; 198/576, 580, 859; 74/436

[56] References Cited

U.S. PATENT DOCUMENTS

| | | | |
|---|---|---|---|
| 1,571,653 | 2/1926 | Textorius | 74/436 |
| 2,512,811 | 6/1950 | Schuck | 74/436 X |
| 2,742,164 | 4/1956 | Francis | 414/237 |
| 2,762,489 | 9/1956 | O'Sullivan | 414/236 X |
| 2,996,199 | 8/1961 | Popper | 414/237 |
| 3,063,577 | 11/1962 | Shields | 414/37 |
| 3,085,700 | 4/1963 | O'Sullivan | 414/237 |
| 3,447,664 | 6/1969 | Goedkoop | 414/236 X |
| 3,477,726 | 11/1969 | Laschenski | 360/92 |

FOREIGN PATENT DOCUMENTS

| | | | |
|---|---|---|---|
| 1152667 | 8/1963 | Fed. Rep. of Germany | 414/32 |
| 2136582 | 2/1973 | Fed. Rep. of Germany | 414/32 |
| 1344282 | 10/1963 | France | 414/32 |
| 735531 | 5/1980 | U.S.S.R. | 414/787 |

*Primary Examiner*—Leslie J. Paperner
*Attorney, Agent, or Firm*—Gifford, Groh, VanOphem, Sheridan, Sprinkle & Dolgorukov

[57] ABSTRACT

An apparatus for moving a plurality of objects or containers for selecting, positioning, or retrieving one of the objects or containers organizes the objects or containers into two similar and parallel packets or stacks. The selection of an individual object is carried out by displacing each of the packets through a distance corresponding to the distance between adjacently stacked objects, and transferring the most upwardly or downwardly extreme object or container from one packet or stack to the other. The hoisting and lowering of the packets of objects is actuated by means of a plurality of screws engaging the edges of the objects, the displacement of an object or container from one packet or stack to the other is actuated by means of one of a pair of carriages moving transversely to the screws. The sequence of motion of the screws and carriages is controlled by two maltese cross-type gears.

31 Claims, 12 Drawing Figures

DEVICE FOR MOVING OBJECTS

BACKGROUND OF THE INVENTION

I. Field of the Invention

The invention pertains to a device for moving objects or containers, and particularly for the selection, positioning or retrieving of an individual one of the objects or containers.

II. Description of the Prior Art

There are presently many applications in which it is necessary to select and retrieve a single object or container of objects from a group of such objects or containers. The objects to be so manipulated may be any object, such as cars in an autosilo, tools to be supplied to a transfer tool machine, supply containers having disposed therein components to be assembled, audiocassette tapes, and the like. An apparatus useful for this purpose commonly must substantially comply with the following requirements. First, the apparatus and the object to be retrieved should be close together so as to be contained in a small space. Second, the object selected should be retrievable and dispatchable to a user station but should continue to be associated with the apparatus and other objects. Third, the objects should be moved smoothly in a controlled fashion, without shaking and independently of orientation. Fourth, the apparatus should be compact and simple to manufacture, and simple yet reliable to use. Fifth, the apparatus should be programmable so as to complete selection while minimizing the retrieving path. Sixth, the apparatus should be adapted for remote control, possibly by a computer. Lastly, the retrieving action should be available for use as a feedback control for the needs of the user.

The previously known devices for moving objects are cumbersome. Supplemental devices in addition to the moving apparatus are needed to complete retrieval of a designated object to the user. The retrieval of one object from a group impairs reinstatement of the group, particularly when the operation of the device is disturbed by shaking, tilting, and the like. Also, the previously known devices are complex, expensive and unreliable in operation, particularly when frequent shaking, bending or the like occurs.

It is therefore an object of the present invention to overcome the aforesaid drawbacks, and further to provide various other advantages.

BRIEF DESCRIPTION OF THE DRAWING

Further objects and advantages of the present invention will become apparent upon consideration of the specification and the accompanying drawing, in which.

DETAILED DESCRIPTION OF THE PREFERRED EMBODIMENT OF THE PRESENT INVENTION

Figure 1:
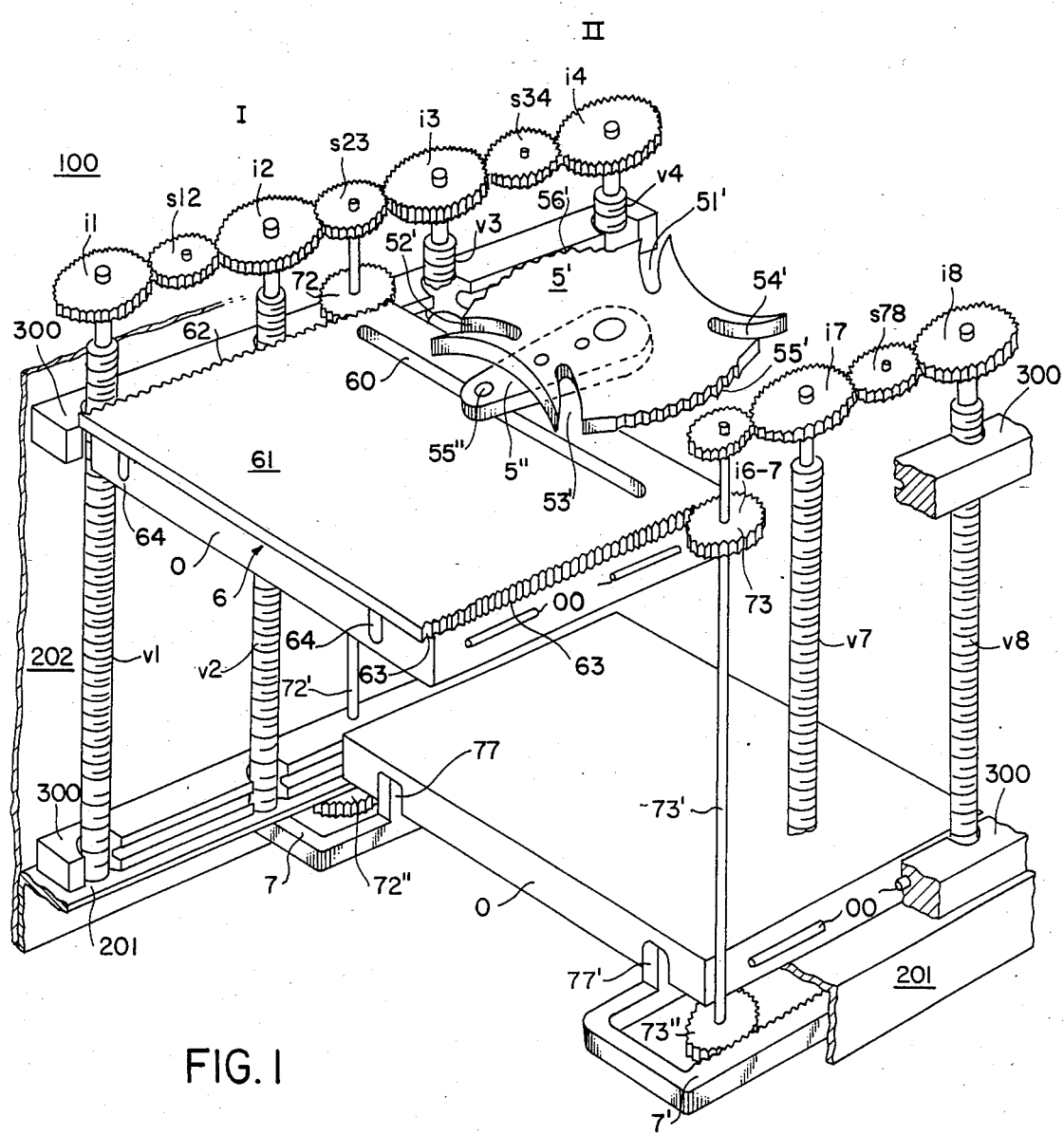
FIG. 1 is a broken perspective view of the present invention, particularly the two inner primary portions of the apparatus, with supports and associated structures for object transfer removed for clarity. The invention is shown in an operative postion, in particular, in the position indicated by the arrows and object positions represented in FIG. 10.

Referring now particularly to FIGS. 1 through 6 of the drawing, the device for moving objects, according to the present invention, comprises a housing body 100 having, at its top, a closed room 200 wherein the primary elements of the apparatus are mounted, and whose walls provide a support for inlet and outlet screws, which will be described in further detail below. Three grooves 211, 212, and 213 are formed in the body housing wall 200' which provide a guide for a carriage for carrying the objects to be moved, which will also be described further below.

A plate 201 is mounted to the foot of the housing body 100. The plate 201 also provides a support for and is connected to the housing body 200 by a plurality of walls 202. Three divisional walls 203, 204, and 205 are fixedly mounted between each pair of walls 202, parallel to one another. The divisional walls will be described in further detail below.

Figure 2:
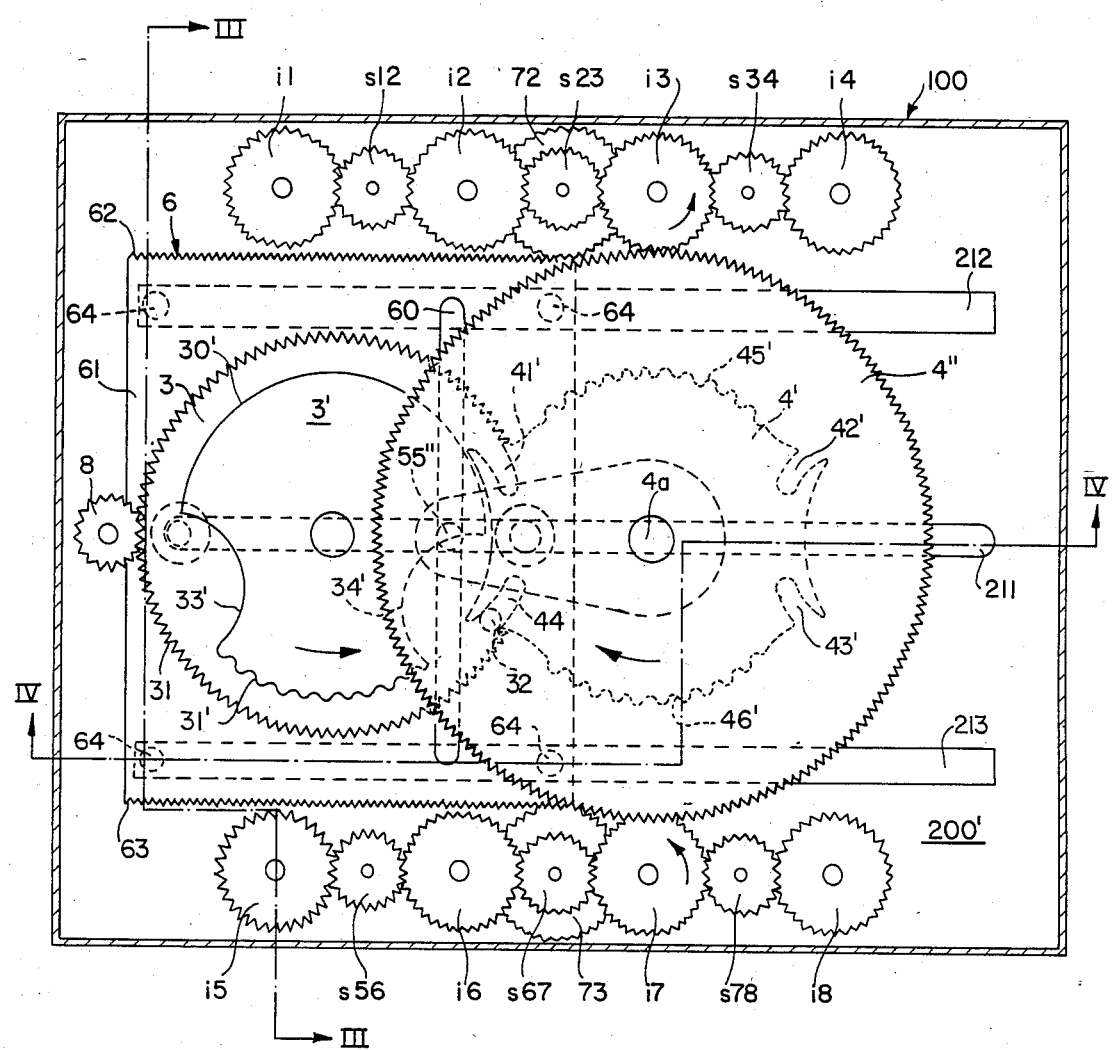
FIG. 2 is a plan sectional view of the apparatus according to the present invention for moving objects, taken along line II—II of FIG. 3.
Figure 3:
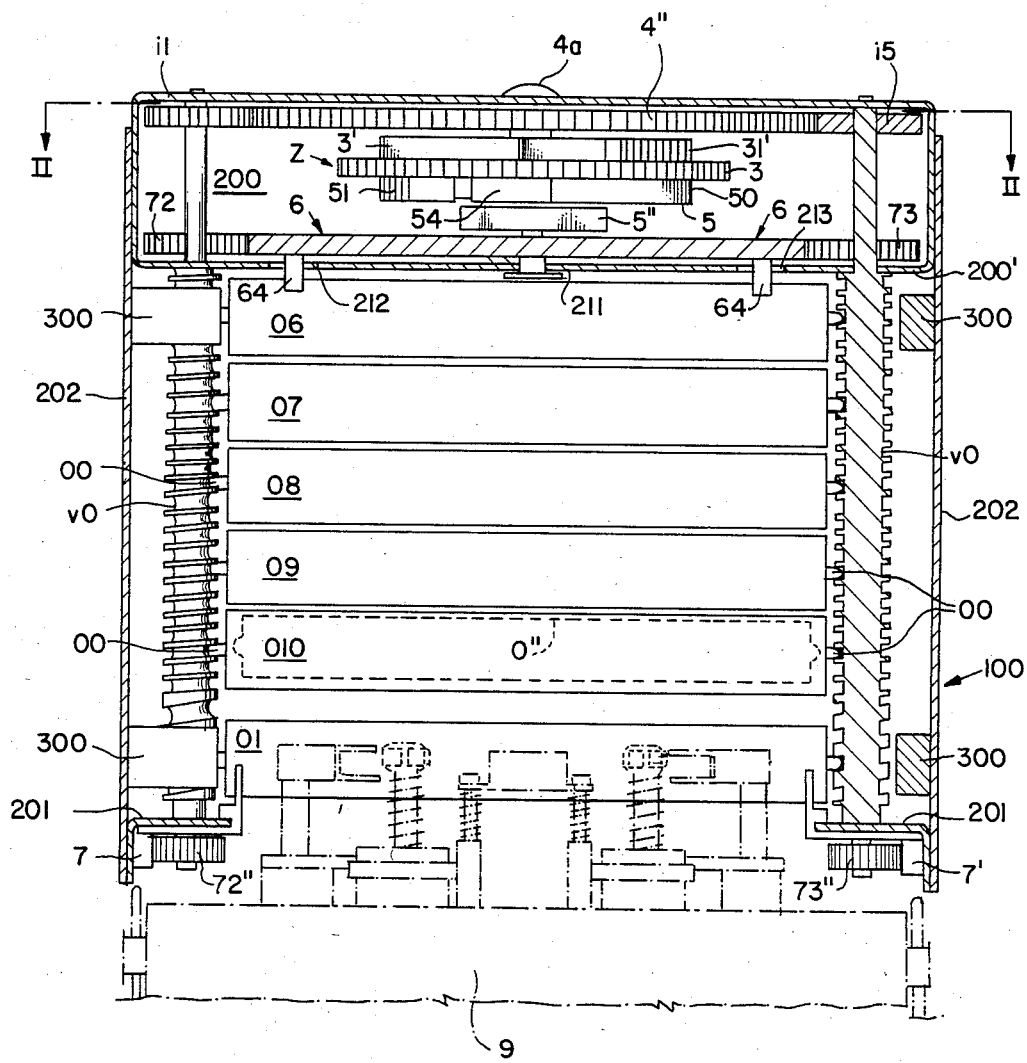
FIG. 3 is a vertical sectional view taken along line III—III of FIG. 2.
Figure 4:
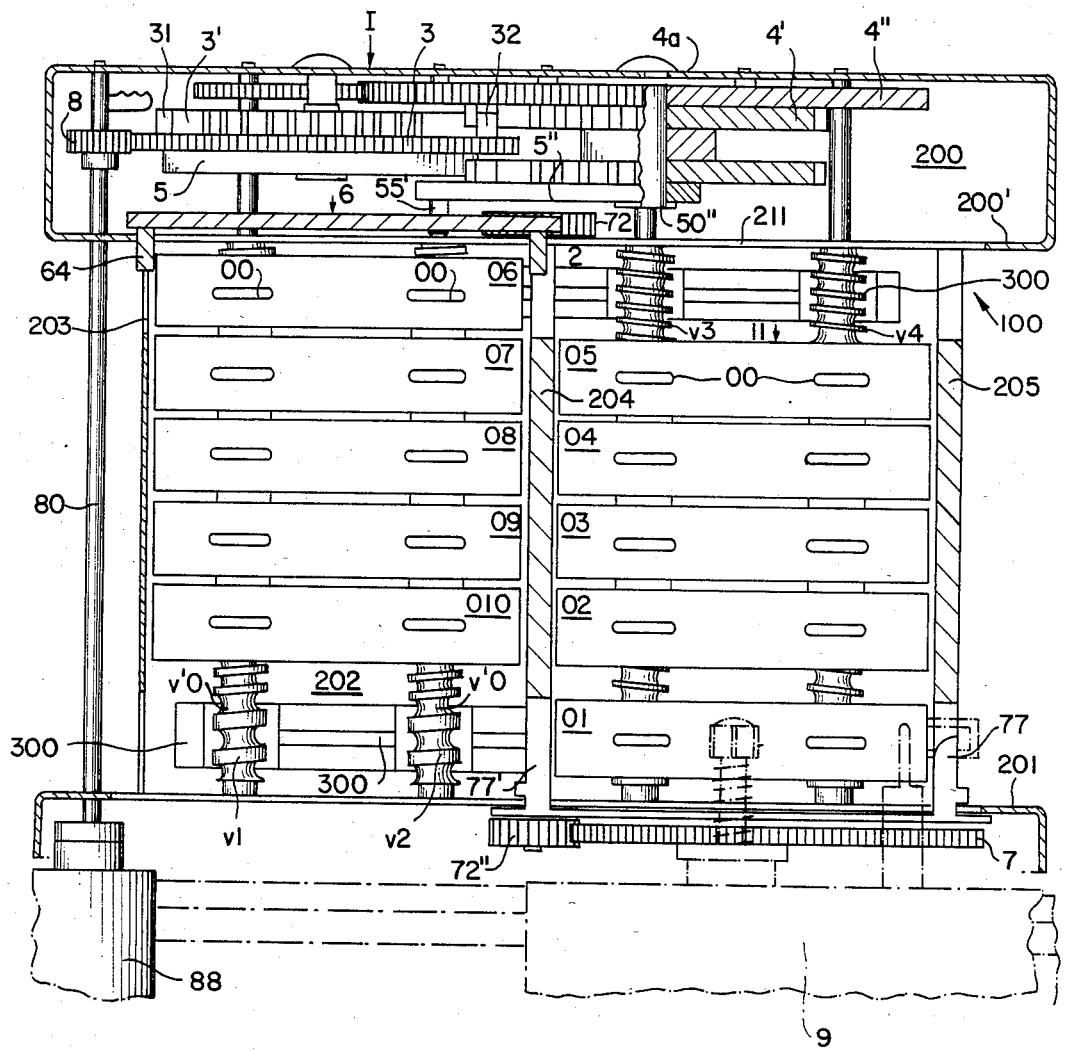
FIG. 4 is a vertical sectional view of the apparatus according to the present invention taken along line IV—IV of FIG. 2.

The objects generally designated by 0, and particularly numbered from 01 to 010, are shown in FIGS. 2, 3 and 4 as parallelopipeds. The objects 0 are characterized by ribs, projections or guides 00 on each of their outer wall sides. The ribs 00 have a cross-sectional shape substantially corresponding to the worm or thread space V0 of the inlet and outlet screws, as further described below. The objects 0 to be moved (for example, ten objects) are stacked in two stacks I and II, each comprising five of the objects 0. Each of the stacks is disposed inside four screws V1, V2, V5, and V6; or V3, V4, V7, and V8; respectively. The ribs 00 of the objects 0 are disposed in the thread spaces of the screws, so that the objects are moved up and down upon rotation of the screws. As will be explained below, all of the screws are driven to rotate in the same direction, but the screws V1, V2, V5, and V6 are threaded oppositely relative to the screws V3, V4, V7 and V8. Therefore, upon rotation of all the screws in the same direction, the objects in stack I are moved in a direction opposite to the direction of stack II, and vice versa.

The thread pitches of all of the screws are equal, so that the object displacements are synchronous, equal and reciprocal. However, it should be appreciated that the bottom section of the screw threads have an increasing pitch to provide a gap or space between the last object 01 and the penultimate object 02. An object whose ribs 00 are set in the thread interspaces V0 of each of the four screws of each group continues to register with the objects in the same stack at right angles to the ribs, but not therealong. This registering is provided by the walls 203, 204 and 205. These latter walls register objects only in a field whose height corresponds to a height of one object less than the height of the stack, that is, in this preferred embodiment, four objects. Consequently, the objects disposed above 06 or under 01 of this field may be transferred from one stack to the other through an opening in wall 204, or from one group of four screws to the other, and vice versa, upon shifting across the screw thread spaces, and from one screw to another into guides 300, respectively. More particularly, this transfer always takes place in two opposite directions, that is, the top object of one stack in one direction, and the bottom object of the other stack in the opposite direction, so that the stacks I and II are constantly maintained with the same number of objects.

Each of the screws V1 through V8 has a gear i1 through i8, respectively, fastened to its tip, for its driving. An idle gear S12, S23 or S34; or S56, S67 or S78; is provided between each pair of adjacent gears i1 and i2, i2 and i3, and i3 and i4; or i5 and i6, i6 and i7, and i7 and i8, respectively. Thus, upon the driving of any gear, all seven gears in each row rotate.

Figure 5:
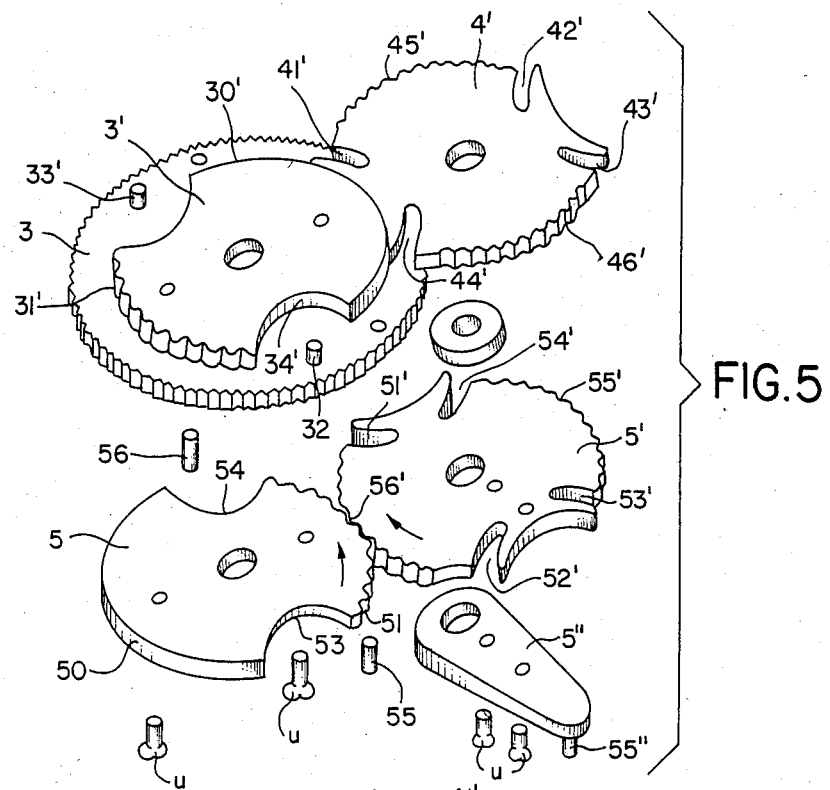
FIG. 5 is an exploded perspective view of the maltese cross gears included in the apparatus, including a set of flat head screws representing a connection between the members shown. Presumming that the members rotate in the direction designated by the arrows, FIG. 5 corresponds to the position shown in FIG. 9, contrarily to FIGS. 1 through 4.
Figure 6:
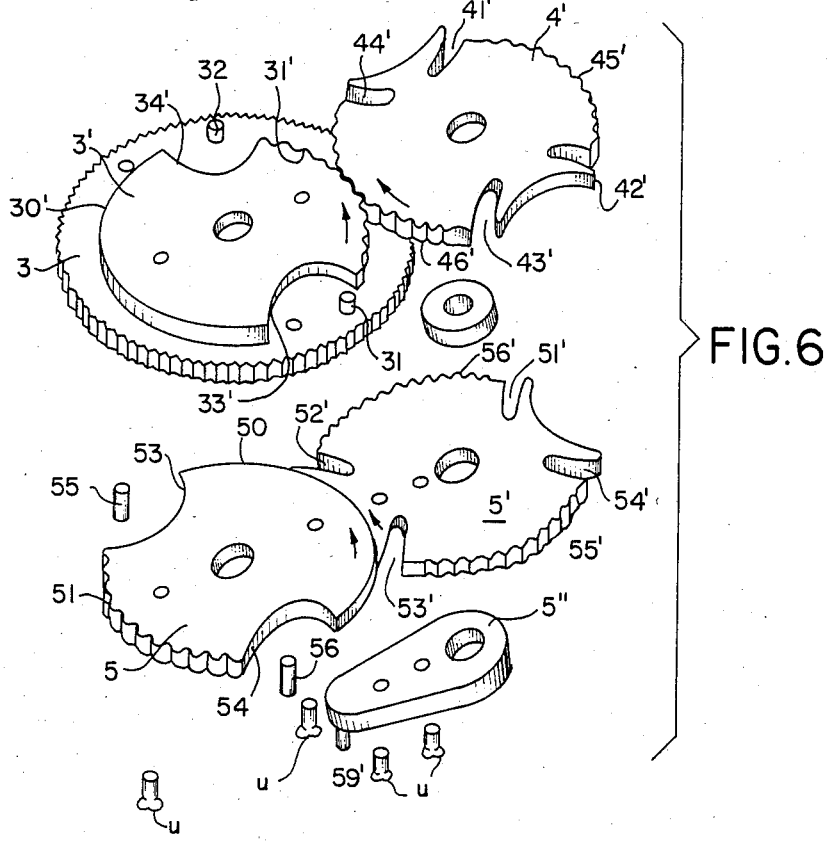
FIG. 6 is a view similar to FIG. 5, but in a position of rotation substantially corresponding to an intermediate condition between those shown in FIGS. 10 and 11.
Figure 7:
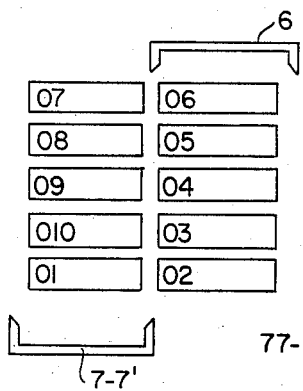
FIG. 7 is a schematic side view of the disposition of the stacked objects or containers at the time motion of the objects is initiated.
Figure 8:
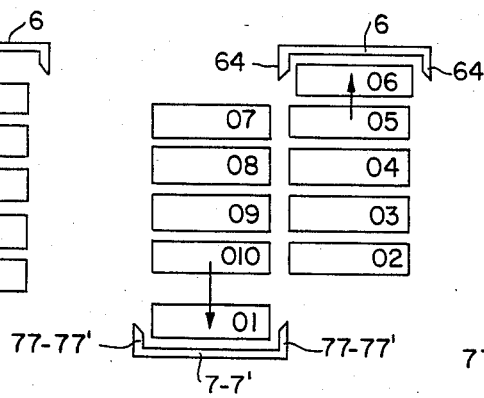
FIG. 8 is a view similar to FIG. 7 but taken at a successive stage, that is, after the first moving step, wherein both stacks are displaced a distance equal to the space between adjacently stacked objects, with a lowering of a bottom object of one of the stacks.
Figure 9:
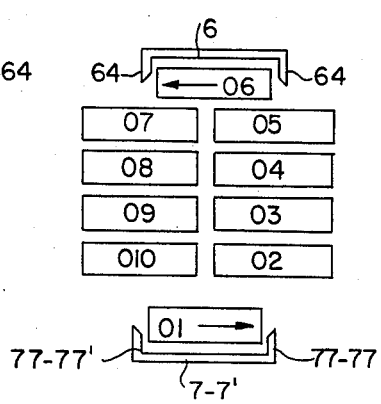
FIG. 9 is a view similar to FIGS. 7 and 8, but showing a following stage, wherein an object, for example, the uppermost object (having been made upper most by the shifting of the stacks) is shown in transit being transferred from one stack to the other in a first direction betweem them, while correspondingly the previously retrieved bottom object is in transit between the two stacks in a second, opposite direction.
Figure 10:
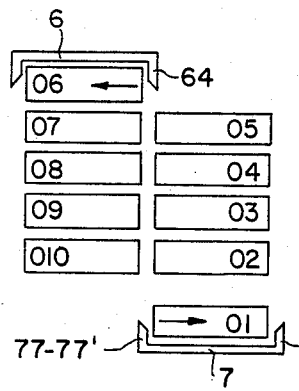
FIG. 10 is a view similar to FIG. 9 but in the next stage, wherein the displacements which are in progress in FIG. 9 are completed.
Figure 11:
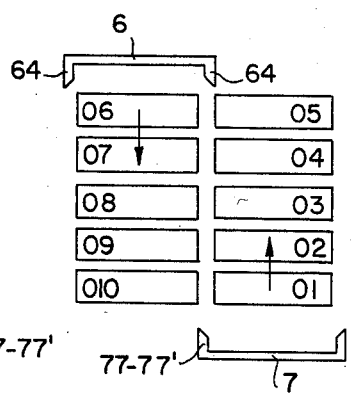
FIG. 11 is a view similar to FIG. 7, in that it shows the starting positions which correspond to the final positions, thus balancing the hoisting and lowering of the stacks.
Figure 12:
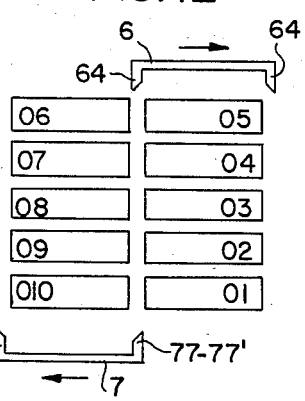
FIG. 12 is a view similar to FIG. 7, wherein, as shown in FIG. 11, the carriage returns to the left.

Driving of these gears is provided by a main gear 4" which meshes with gear i3 of one gear row and gear i7 of the other gear row (FIGS. 2 and 3). Main gear 4" is idly mounted on a rod 4a. A driven, toothed, maltese cross-like wheel 4' is fastened thereto. The wheel 4' is provided with four openings 41', 42', 43', and 44', and two toothed sections 45' and 46'. The wheel 4' and the main gear 4" are driven by a unit Z (FIGS. 5 and 6), which comprises a gear 3, pins 31 and 32, and a projection 3'. The projection 3' is partially moon-shaped (at 30'), partially toothed (at 31'), and partially indented (at 33' and 34'). The bottom of the unit Z is provided with a projection 5 which is partially moon-shaped (at 50), partially toothed (at 51), and partially indented (at 53 and 54). The bottom of the unit Z also comprises a pair of pins 55 and 56 inserted in the underside of wheel 3. The driving wheel 5 is coaxial with and is the same size and shape as the gear 3', although it is offset 180 degrees with respect to the gear 3' (FIGS. 5 and 6). Similarly, the pins 55 and 56 are 180 degrees offset with respect to pins 31 and 32, respectively. The projection 5 thus serves as the driving wheel of the maltese cross device which includes driven units 5' and 5", which are idly mounted and coaxially pivoted on the rod 4a and axially retained thereon by a flange 50". The projection 5' is shaped exactly like the projection 4', and is provided with four similar openings 51', 52', 53' and 54', and two toothed sections 55' and 56'.

The bottom of the member 5" is provided with a projecting crankpin 55". The crankpin 55" engages a groove 60 formed in an upper carriage 6. The upper carriage 6 substantially comprises a rectangular plate 61 with two toothed sides 62 and 63, and four bottom downwardly projecting registering protrusions 64. Each of the toothed sides 62 and 63 meshes with a pinion 72 or 73, respectively, fastened on a shaft 72' or 73', respectively. The shafts are each provided at their bottoms with a corresponding gear 72" or 73". Each gear 72" or 73" meshes with one of a pair of bottom carriage racks 7 or 7', respectively. Each of the racks 7 and 7" is provided with a pair of projections 77 and 77', whose purpose is described below. The driving wheel 3 is driven by a driving pinion 8 fastened to a shaft 80, which is driven by a motor 88.

With particular reference to FIGS. 3 and 4, the device of the present invention is shown disposed over a hypothetical user device 9. As illustrated in phantom, the device 9 can, for example, comprise a magnetic tape recorder head, when the objects 0 comprise magnetic tape cassette holders. Retreival of the objects container 0", as shown in FIG. 3, may be for the purpose of mounting the same on the magnetic tape recorder head 9.

Operation of the device according to the present invention should be easily understood, in light of the foregoing description. The motor 88 is connected to an electrical supply and is powered by means, not shown, to permit it to be turned in either rotational direction. In one direction of the motor 88, for example, that indicated by the arrows in FIGS. 1, 2, 5, and 6, the transfer of a single object from stack I to stack II, and vice versa, takes place through a carousel as shown in FIGS. 7 through 12. Of course, if the motor 88 turns in a direction opposite to that indicated by the arrows, the flow diagram comprised in FIGS. 7 through 12 is reversed, along with a reversal of the direction of rotation of all of the rotating members. The control of which direction to activate the motor 88 depends, of course, upon the location of the object 0 to be selected, relative to the station 9 at which it is desired to position the object. Upon actuation of the motor 88, the shaft 80 rotates and in turn drives the gear 8 which then drives the unit Z. The unit Z, it should be remembered, includes wheels 3' and 5, and pairs of pins 31 and 32, and 55 and 56. When the rotational position of the elements of the device corresponds with the position shown in FIG. 5, it will be seen that the moon section 30' prevents rotation of the correspondly shaped section of the wheel 4', while at the same time the toothed section 51 of the wheel 5 meshes with the toothed section 56' of the wheel 5', thus turning the arm 5" with the crank pin 55". The turning of the arm 5" and crank pin 55" causes the carriage 6 to transfer and, in turn, rotates the gears 72, 73, 72" and 73" and causes a reverse transfer of the carriage 7. This results in the simultaneous transfer of the object 01 from one stack to the other as well as the transfer of the upper object 06 from one stack the other. This transfer corresponds to the action shown in FIG. 9.

Similarly, as shown in FIG. 6, upon release of the wheel 5' by the wheel 5 (for example, when the moon section 50 cooperates with the section between the openings 52' and 53'), the wheel 5' stops rotating, thus stopping the arm 5" and the members connected to it. When the pin 32 of the wheel 3 reaches the opening 44' of the wheel 4', the moon section 30' of the wheel 3 is disengaged from the wheel 4'. First the pin 32, then the toothed section 31' (in cooperation with the toothed section 46'), and finally the pin 31 (becoming disposed in the opening 43') act to drive the wheels 4' and 4". These each turn half of a turn, so as to carry the section between openings 43' and 42' toward the moon section 30', as shown in FIGS. 2 and 6, but with the wheel 4' and 4" being offset 180 degrees. During this half turn of the toothed wheel 4" the gears i3 and i7 meshing therewith turn an angle of, for example, 900 degrees. The product of the amount of rotation of the gear i3 (or the gear i7) times the screw thread pitch corresponds to a mutual, opposite and synchronous movement of stack I and II a distance of one pitch between two adjacent objects 0. In absolute terms, this is the same as a distance of one half between the two stacks moved. Of course, where the screw threads have a wider pitch v'0, the objects 0 undergo a longer movement, moving away from adjacent objects. These hoistings and lowerings correspond to those shown in FIGS. 10 and 11. The mutual hoisting and lowering of the stacks permits interaction between the projections 77, 77' and 64, and the bottom and upper objects 01 and 06, as that upon displacement of the carriages 6, 7 and 7', the objects 01 and 06 are also automatically displaced. Subsequently, when each carriage has ended a stroke from one stack to the other, with the object 0 therein, the hoisting and lowering of the stacks results in retrieval of the objects from those carriages, and the carriages are empty for their return stroke, to their positions shown in FIGS. 7 and 12.

What is claimed is:

1. In a transfer mechanism including a first carriage, for moving material or objects engageable with said carriage, the combination comprising:
   a drive gear;
   transfer means for moving said material or objects with respect to said carriage;
   a first maltese gear connected to said carriage and driven by said drive gear so as to move said carriage; and
   a second maltese gear connected to said transfer means and driven by said drive gear so as to move said material or objects with respect to said carriage;
   wherein said first and second maltese gears are alternatively driven by said drive gear, and
   wherein the circumference of each of said maltese gears comprises a pair of diametrically opposed gear tooth segments, a pair of diametrically opposed concave segments, and a somewhat radially inwardly depending opening disposed between each adjacent gear tooth and concave segment.

2. The invention according to claim 1, wherein said first maltese gear is coaxial with but rotatably journalled with respect to said second maltese gear.

3. The invention according to claim 1, wherein said first and second maltese gears are parallel.

4. The invention according to claim 1, wherein said mechanism comprises a second carriage parallel to but spaced from said first carriage, said second carriage being operatively connected to and driven by said transfer means so as to move synchronously with, but opposite to, movement of said first carriage.

5. The invention according to claim 1, wherein said carriage reciprocates in a linear path, and wherein said transfer means moves said material or object relative to said carriage at the ends of said linear path.

6. The invention according to claim 1, wherein said drive gear comprises the prime mover for the whole of said transfer mechanism.

7. The invention according to claim 1, wherein said openings are curved somewhat parallel to said concave segment.

8. In a transfer mechanism including a first carriage, for moving material or objects engageable with said carriage, the combination comprising:
   a drive gear;
   transfer means for moving said material or objects with respect to said carriage;
   a first maltese gear connected to said carriage and driven by said drive gear so as to move said carriage; and
   a second maltese gear connected to said transfer means and driven by said drive gear so as to move said material or objects with respect to said carriage;
   wherein said first and second maltese gears are alternatively driven by said drive gear, and
   wherein said mechanism comprises a pair of crescent gears coaxial with and affixed to said drive gear, one each operatively engaging one of said first and second maltese gears, the circumference of said crescent gears comprising a gear tooth segment, a pair of cutaway segments disposed on each side of said gear tooth segment, and a circularly arcuate segment between said cutaway segments opposite said gear tooth segment, said arcuate segment subtending about half of said circumference.

9. The invention according to claim 8, wherein said drive gear is sandwiched between the engaged crescent and maltese gears.

10. The invention according to claim 8, wherein said crescent gears are disposed 180 degrees relative to one another.

11. The invention according to claim 8, wherein the circumference of each of said maltese gears comprises a pair of diametrically opposed gear tooth segments, a pair of diametrically opposed concave segments, and a somewhat radially inwardly depending opening disposed between each adjacent gear tooth and concave segment, and wherein the radius of curvature of said concave segments of said maltese gears is equal to the radius of curvature of the arcuate segment of said crescent gears.

12. The invention according to claim 11, wherein said driving gear bears a pair of pins, one each adjacent each of said cutaway segments on one of said crescent gears, said pins engageable with said openings on said second maltese gear.

13. The invention according to claim 8, wherein said first maltese gear is coaxial with but rotatably journalled with respect to said second maltese gear.

14. The invention according to claim 8, wherein said first and second maltese gears are parallel.

15. The invention according to claim 8, wherein said mechanism comprises a second carriage parallel to but spaced from said first carriage, said second carriage being operatively connected to and driven by said transfer means so as to move synchronously with, but opposite to, movement of said first carriage.

16. The invention according to claim 8, wherein said carriage reciprocates in a linear path, and wherein said transfer means moves said material or object relative to said carriage at the ends of said linear path.

17. The invention according to claim 8, wherein said drive gear comprises the prime mover for the whole of said transfer mechanism.

18. In a transfer mechanism including a first carriage, for moving material or objects engageable with said carriage, the combination comprising:
   a drive gear;
   transfer means for moving said material or objects with respect to said carriage;
   a first maltese gear connected to said carriage and driven by said drive gear so as to move said carriage; and
   a second maltese gear connected to said transfer means and driven by said drive gear so as to move said material or objects with respect to said carriage;
   wherein said first and second maltese gears are alternatively driven by said drive gear;
   wherein said transfer means comprises a transfer gear affixed to said second maltese gear, and at least one screw driven by said transfer gear, said screw being engageable with said material or objects; and
   wherein: said transfer gear, said first maltese gear, and said second maltese gear are coaxial with one another; said transfer gear is affixed to said second maltese gear; and said first maltese gear is rotatably journalled with respect to said transfer and said second maltese gears.

19. The invention according to claim 18, wherein said screw possesses segments of threading having at least two different pitches.

20. The invention according to claim 18, wherein said screw is disposed perpendicular to said carriage.

21. The invention according to claim 18, wherein said at least one screw is disposed perpendicular to the plane of said transfer gear.

22. The invention according to claim 18, wherein said carriage comprises a slot, and said first maltese gear comprises a dog affixed thereto which is slidably disposed in said slot, so as to reciprocally move said carriage upon rotation of said first maltese gear.

23. The invention according to claim 18, wherein said transfer means additionally comprises at least one projection on said material or object engageable with the threading on said screw.

24. The invention according to claim 18, wherein said transfer means comprises at least one pair of screws, one each on opposing sides of said transfer gear, and wherein said material or objects bear opposing projections, one each engageable with one of said screws.

25. The invention according to claim 18, wherein said first and second maltese gears are parallel.

26. The invention according to claim 18, wherein said mechanism comprises a second carriage parallel to but spaced from said first carriage, said second carriage being operatively connected to and driven by said transfer means so as to move synchronously with, but opposite to, movement of said first carriage.

27. The invention according to claim 18, wherein said carriage reciprocates in a linear path, and wherein said transfer means moves said material or object relative to said carriage at the ends of said linear path.

28. The invention according to claim 18, wherein said drive gear comprises the prime mover for the whole of said transfer mechanism.

29. The invention according to claim 18, wherein the circumference of each of said maltese gears comprises a pair of diametrically opposed gear tooth segments, a pair of diametrically opposed concave segments, and a somewhat radially inwardly depending opening disposed between each adjacent gear tooth and concave segment.

30. The invention according to claim 29, wherein said openings are curved somewhat parallel to said concave segment.

31. The invention according to claim 18, wherein said mechanism comprises a pair of crescent gears coaxial with and affixed to said drive gear, one each operatively engaging one of said first and second maltese gears, the circumference of said crescent gears comprising a gear tooth segment, a pair of cutaway segments disposed on each side of said gear tooth segment, and a circularly arcuate segment between said cutaway segments opposite said gear tooth segment, said arcuate segment subtending about half of said circumference.

* * * * *